US008095715B1

(12) United States Patent
Overby

(10) Patent No.: US 8,095,715 B1
(45) Date of Patent: Jan. 10, 2012

(54) SCSI HBA MANAGEMENT USING LOGICAL UNITS

(75) Inventor: Mark A. Overby, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 369 days.

(21) Appl. No.: 11/470,032

(22) Filed: Sep. 5, 2006

(51) Int. Cl.
*G06F 3/00* (2006.01)
*G06F 13/12* (2006.01)
*G06F 13/00* (2006.01)
*G06F 13/14* (2006.01)
*G06F 12/00* (2006.01)
*G06F 21/00* (2006.01)
*G06F 9/455* (2006.01)

(52) U.S. Cl. .......... 710/300; 710/5; 710/15; 710/16; 710/30; 710/62; 710/305; 711/6; 711/170; 703/25; 718/1

(58) Field of Classification Search .......... None
See application file for complete search history.

(56) References Cited

U.S. PATENT DOCUMENTS

| | | | | |
|---|---|---|---|---|
| 5,333,277 A * | 7/1994 | Searls | ............. | 710/300 |
| 5,548,783 A * | 8/1996 | Jones et al. | ............. | 710/16 |
| 5,790,775 A * | 8/1998 | Marks et al. | ............. | 714/9 |
| 5,809,285 A * | 9/1998 | Hilland | ............. | 703/25 |
| 5,867,671 A * | 2/1999 | Adamson | ............. | 710/5 |
| 5,996,024 A * | 11/1999 | Blumenau | ............. | 719/326 |
| 6,587,959 B1 * | 7/2003 | Sjolander et al. | ............. | 714/4 |
| 6,640,278 B1 * | 10/2003 | Nolan et al. | ............. | 711/6 |
| 6,766,359 B1 * | 7/2004 | Oliveira et al. | ............. | 709/213 |
| 6,816,917 B2 * | 11/2004 | Dicorpo et al. | ............. | 710/5 |
| 6,999,913 B2 * | 2/2006 | Hensley | ............. | 703/25 |
| 7,240,098 B1 * | 7/2007 | Mansee | ............. | 709/212 |
| 7,366,815 B2 * | 4/2008 | Kadowaki | ............. | 710/305 |
| 7,406,617 B1 * | 7/2008 | Athreya et al. | ............. | 714/4 |
| 7,461,141 B2 * | 12/2008 | Byers et al. | ............. | 709/221 |
| 7,464,152 B2 * | 12/2008 | Ishizaki et al. | ............. | 709/223 |
| 2002/0029281 A1 * | 3/2002 | Zeidner et al. | ............. | 709/230 |
| 2003/0085914 A1 * | 5/2003 | Takaoka et al. | ............. | 345/734 |
| 2005/0228937 A1 * | 10/2005 | Karr et al. | ............. | 711/6 |
| 2005/0235132 A1 * | 10/2005 | Karr et al. | ............. | 711/203 |
| 2006/0005186 A1 * | 1/2006 | Neil | ............. | 718/1 |
| 2006/0053266 A1 * | 3/2006 | Nakagawa et al. | ............. | 711/170 |

* cited by examiner

*Primary Examiner* — Tariq Hafiz
*Assistant Examiner* — Henry Yu
(74) *Attorney, Agent, or Firm* — Patterson & Sheridan, LLP

(57) ABSTRACT

Systems and methods for accessing host bus adapter (HBA) management features for Small Computer System Interface (SCSI) based HBAs produced by different vendors use a standard interface. A virtual SCSI target is created to emulate each HBA in a system, representing the HBA as a logical unit. Standard commands specified for logical units are used by an HBA device driver to perform HBA management operations. The standard commands may be used to access HBA management features for any HBA regardless of the vendor. Therefore, the HBA communication interface is standardized for HBA devices, permitting efficient access regardless of the operating system or HBA vendor.

20 Claims, 8 Drawing Sheets

PRIOR ART

SCSI HBA MANAGEMENT USING LOGICAL UNITS

BACKGROUND OF THE INVENTION

1. Field of the Invention

Embodiments of the present invention generally relate to management of Small Computer System Interface (SCSI) based host bus adapters (HBAs) or HBAs that present a SCSI interface.

2. Description of the Related Art

Conventional SCSI-based HBAs are managed using a vendor-specific mechanism provided by the HBA vendor. Therefore, SCSI-based HBAs do not have standardized interfaces that may be used to access management features across different operating systems.

FIG. 1A illustrates a prior art conceptual diagram of the communication layers used to perform HBA management. A storage management application 100 issues commands to one or more HBAs produced by different vendors, e.g., HBA 105 and HBA 106 to perform management operations. In order to issue commands to HBA 105, storage management application 100 communicates through a vendor-specific software component 101 and HBA device driver 103 that are provided by the vendor of HBA 105. Likewise, in order to issue commands to HBA 105, storage management application 100 communicates through a vendor-specific software component 102 and HBA device driver 104 that are provided by the vendor of HBA 106.

FIG. 1B illustrates a prior art flow diagram of an exemplary method for performing conventional HBA management. In step 110 storage management application 100 accesses a first HBA driver in a vendor-specific manner. Storage management application 100 may use an applications programming interface (API) call provided by vendor specific software, such as an API library. In step 120 vendor-specific HBA device driver 103 communicates with HBA 105 to provide the command specified by the API call to HBA 105 for execution. In step 125 HBA device driver 103 determines if HBA 105 has completed execution of the command, and, if not, step 125 is repeated.

If, in step 125 HBA device driver 103 determines that HBA 105 has completed execution of the command, then HBA device driver 103 provides that information to storage management application 100 via vendor specific software 101, and in step 130 storage management application 100 determines if another HBA, provided by a different vendor should receive a vendor specific command corresponding to the command received by HBA 105. If, in step 130 storage management application 100 determines that another HBA should receive the command, then storage management application 100 returns to step 110 and repeats step 110, 120, and 125, using vendor specific software 102 and vendor specific HBA device driver 104 to access HBA 106. If, in step 130 storage management application 100 determines that another HBA should not receive the command, then in step 135 command execution is complete.

Because there is not a standard communication method defined for HBA devices, storage management application 100 uses vendor specific software 101 and 102 to communicate with HBA 105 and 106, respectively. When storage management application 100 needs to send the same command to each HBA, the command is sent separately, using each vendor-specific manner rather than sending a single command to all of the HBAs in the system simultaneously. Accordingly, it is desirable to access HBA management features for HBAs produced by different vendors using a standard interface.

SUMMARY OF THE INVENTION

Systems and methods provide a standard interface for accessing HBA management features for SCSI based HBAs produced by different vendors. In conventional systems a storage management application uses each vendor-specific access mechanism to separately send management commands to each HBA in a system rather than sending a single command to all of the HBAs in the system simultaneously. The present invention permits the storage management application to simultaneously send commands to all of the HBAs in the system, permitting efficient access regardless of the operating system or HBA vendor.

A virtual SCSI target is created to emulate each HBA in a system, representing the HBA as a logical unit. Standard commands specified for logical units are used by an HBA device driver to perform HBA management operations. The standard commands may be used to access HBA management features for any HBA regardless of the vendor. Therefore, the HBA communication interface is standardized for HBA devices, permitting efficient management regardless of the operating system or HBA vendor.

Various embodiments of a method of the invention for standardizing communication between a storage management application and multiple Small Computer System Interface (SCSI) host bus adapters, include representing a first host bus adapter as a first logical unit coupled to a first SCSI bus through a first virtual SCSI target that is not physically present, intercepting a management command produced by the storage management application and output to the first logical unit for execution by the first SCSI host bus adapter, and providing the management command to the first SCSI host bus adapter for execution without transmitting the management command over the first SCSI bus.

Various embodiments of the invention include a computer readable medium storing instructions for causing a processor to use a standard interface to access management features of a Small Computer System Interface (SCSI) host bus adapter. The instructions cause a processor to perform the steps of responding to an inquiry received from an operating system with a data structure describing the SCSI host bus adapter as a logical unit supporting the management features and representing the host bus adapter as the logical unit that is coupled to a SCSI bus through a virtual SCSI target that is not physically present.

Various embodiments of the invention include a system for standardizing communication between a storage management application and multiple Small Computer System Interface (SCSI) host bus adapters. The system includes a central processing unit (CPU), a system memory, a first SCSI host bus adapter, and virtual SCSI target. The CPU is configured to execute the storage management application. The system memory is coupled to the CPU and configured to store the storage management application. The first SCSI host bus adapter is coupled to the system memory to provide a SCSI bus. The virtual SCSI target is configured to emulate the first SCSI host bus adapter as a logical unit coupled to the SCSI bus.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

In conventional systems including multiple HBAs provided by different vendors, a storage management application uses vendor-specific access mechanisms to separately send management commands to each HBA. Systems and methods of the present invention permit the storage management application to simultaneously send commands to all of the HBAs in the system using a standard interface, permitting efficient access regardless of the operating system or HBA vendor. The standard interface may also be used with a single HBA to provide efficient access for management operations while communicating with SCSI targets in the system.

Figure 1A:
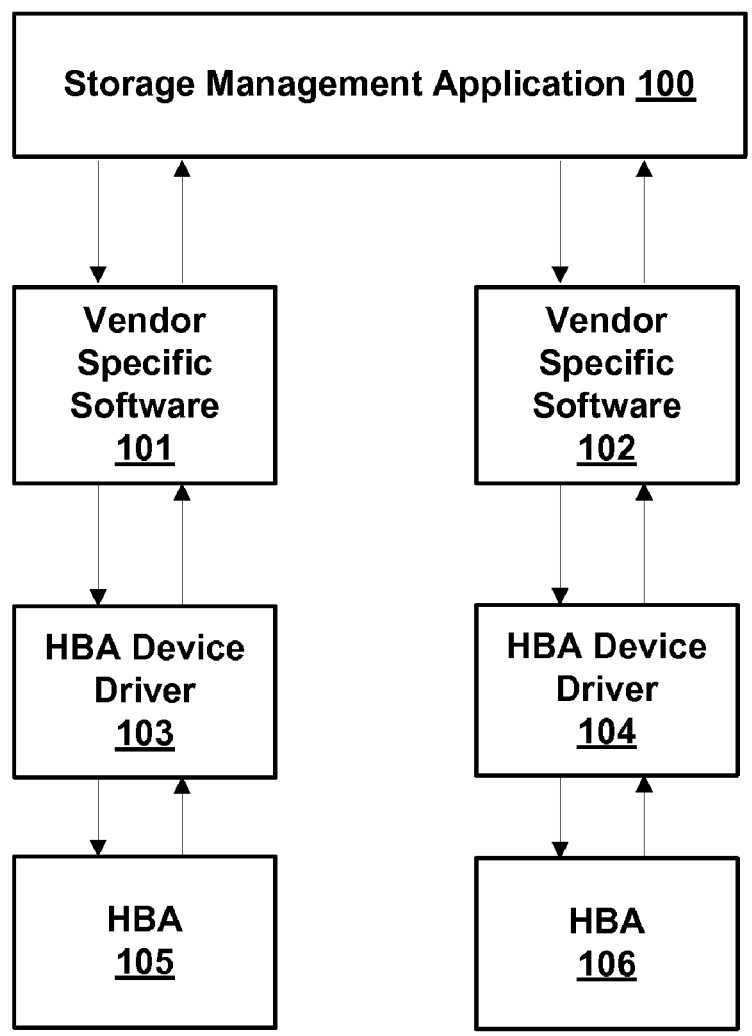
FIG. 1A illustrates a prior art conceptual diagram of the communication layers used to perform HBA management.
Figure 1B:
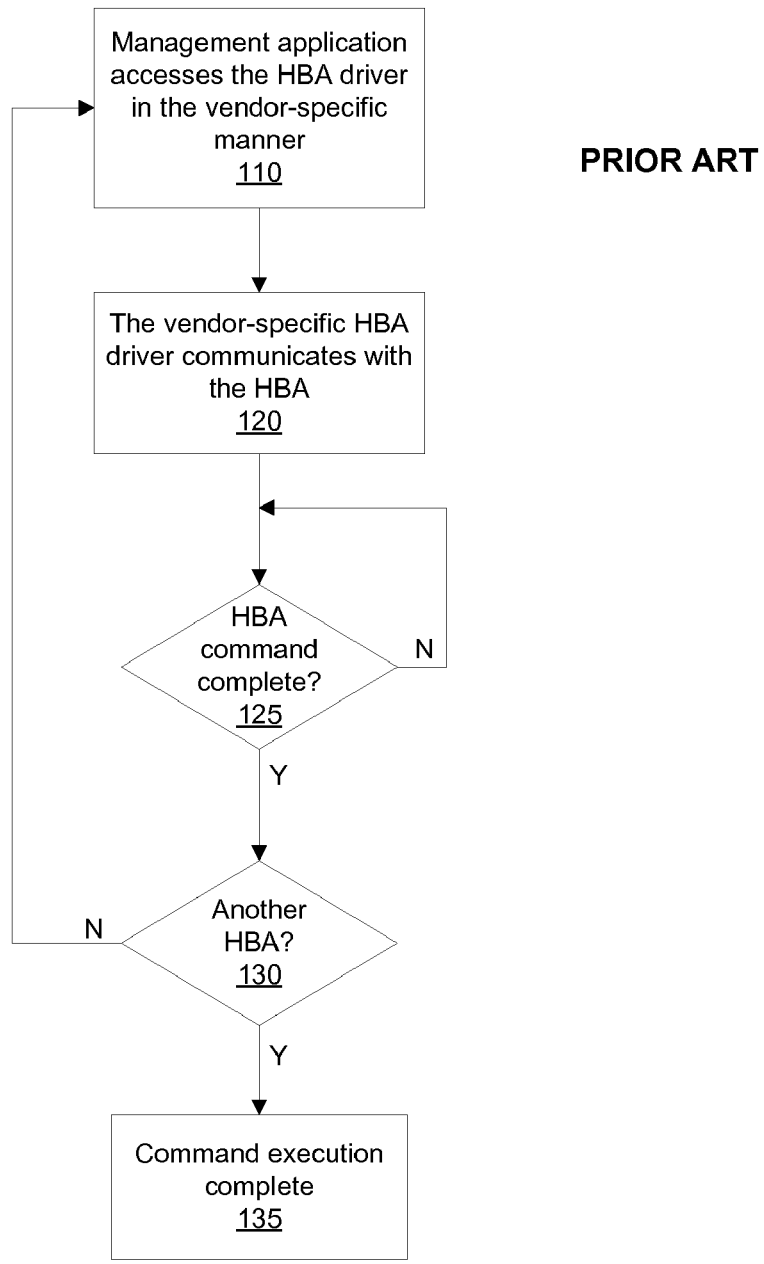
FIG. 1B illustrates a prior art flow diagram of an exemplary method of performing conventional HBA management.
Figure 2A:
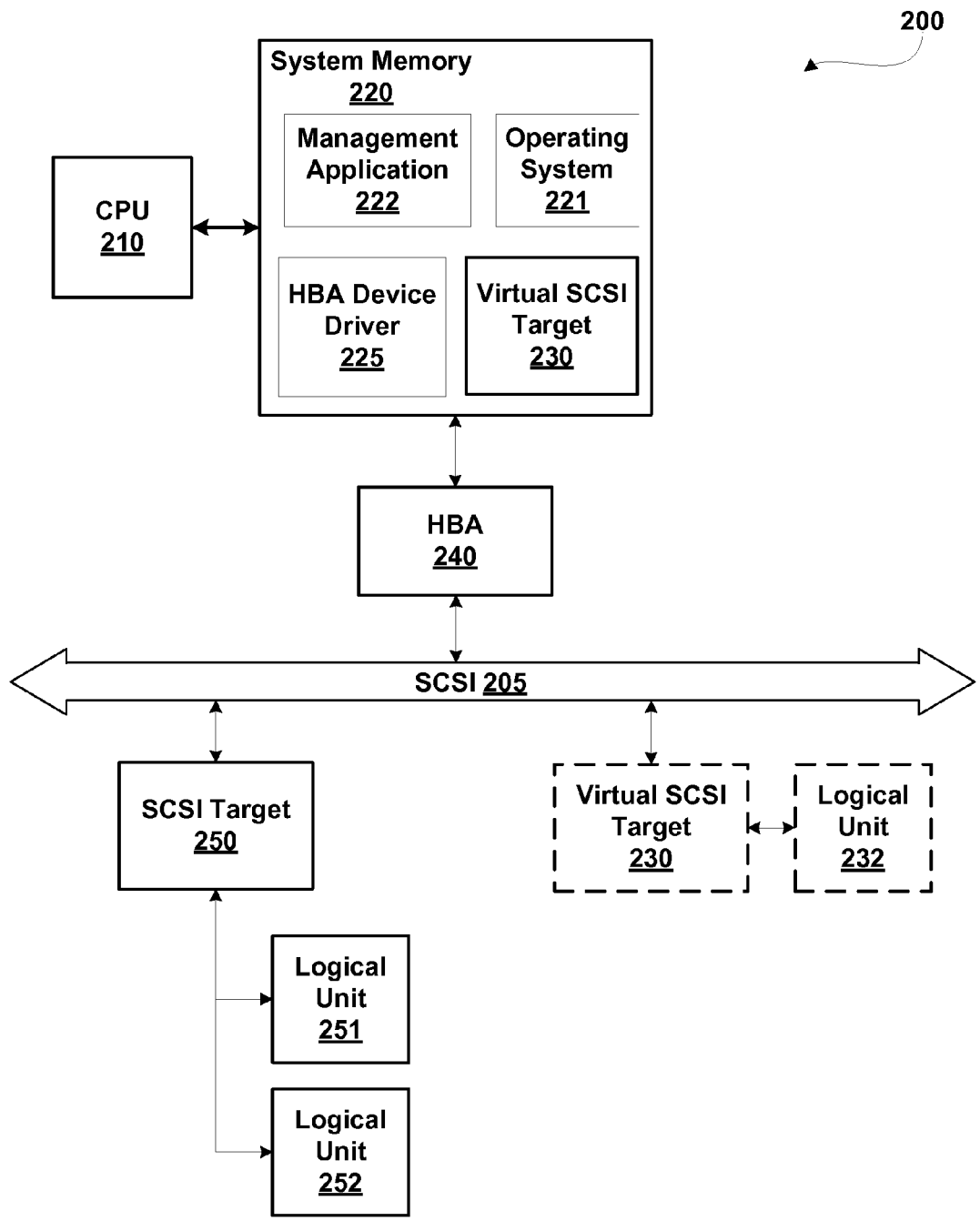
FIG. 2A illustrates a conceptual diagram of a computing system including a central processing unit (CPU) and SCSI components in accordance with one or more aspects of the present invention.

FIG. 2A illustrates a conceptual diagram of a computer system 200 including a central processing unit (CPU) 210 and SCSI components, HBA 240 and SCSI target 250, in accordance with one or more aspects of the present invention. In other embodiments of the present invention additional HBAs 240 may be included in computer system 200. The additional HBAs 240 are coupled to system memory 220 to provide an additional SCSI bus similar to SCSI 205. In some embodiments of the present invention, HBA 240 follows the serial advanced technology attachment (SATA) protocol.

CPU 210 is coupled to a system memory 220 that includes storage resources, such as random access memory (RAM). HBA 240 is coupled to system memory 220 and provides an interface to SCSI bus 205. An operating system 221, e.g., Microsoft Windows, Linux, or the like, is stored in system memory 220 for execution by CPU 210. A management application 222 and HBA device driver 225 are stored in system memory 200. Management application 222 accesses HBAs, such as HBA 240, to perform management operations of storage devices, e.g., change PHY settings, and generally refers to application software that runs on top of operating system 221 in computer system 200. HBA device driver 225 is provided by the vendor of HBA 240 and translates commands provided by management application 222, e.g., SCSI management protocol (SMP) messages, for execution by HBA 240. Similarly, HBA device driver 225 also communicates status of HBA 240 back to HBA device driver 225.

Each SCSI target coupled to SCSI 205, e.g., SCSI target 250, in computer system 200 has a unique identifier that is used to communicate with the device. In one embodiment of the present invention, SCSI target 250 is a SCSI device that is coupled to logical unit 251 and 252. Logical units 251 and 252 are storage devices such as tape drive, disk drive, enclosure device, processor, or the like. Conventional operating systems provide interfaces to access logical units, such as logical unit 251 and 252. Conventional operating systems do not provide an interface to allow HBA management software, such as management application 222, to access HBA 240.

A software component, virtual SCSI target 230, is stored in system memory and emulates a logical unit, enabling a conventional operating system and management application 222 to communicate with HBA 240 and any other HBAs in computer system 200 as logical units. From the point of view of operating system 221 and management application 222, virtual SCSI target 230 appears as a physical device coupled to a logical unit 232 on SCSI bus 205. Therefore, virtual SCSI target 230 and logical unit 232 are drawn with dashed lines in FIG. 2A, indicating that these virtual components appear as physical devices to operating system 221 and management application 222. Virtual SCSI target 230 intercepts management commands produced by management application 222 for execution by HBA 240. Instead of being transmitted over SCSI bus 205, the intercepted management commands are provided to HBA 240 by virtual SCSI target 230.

Figure 2B:
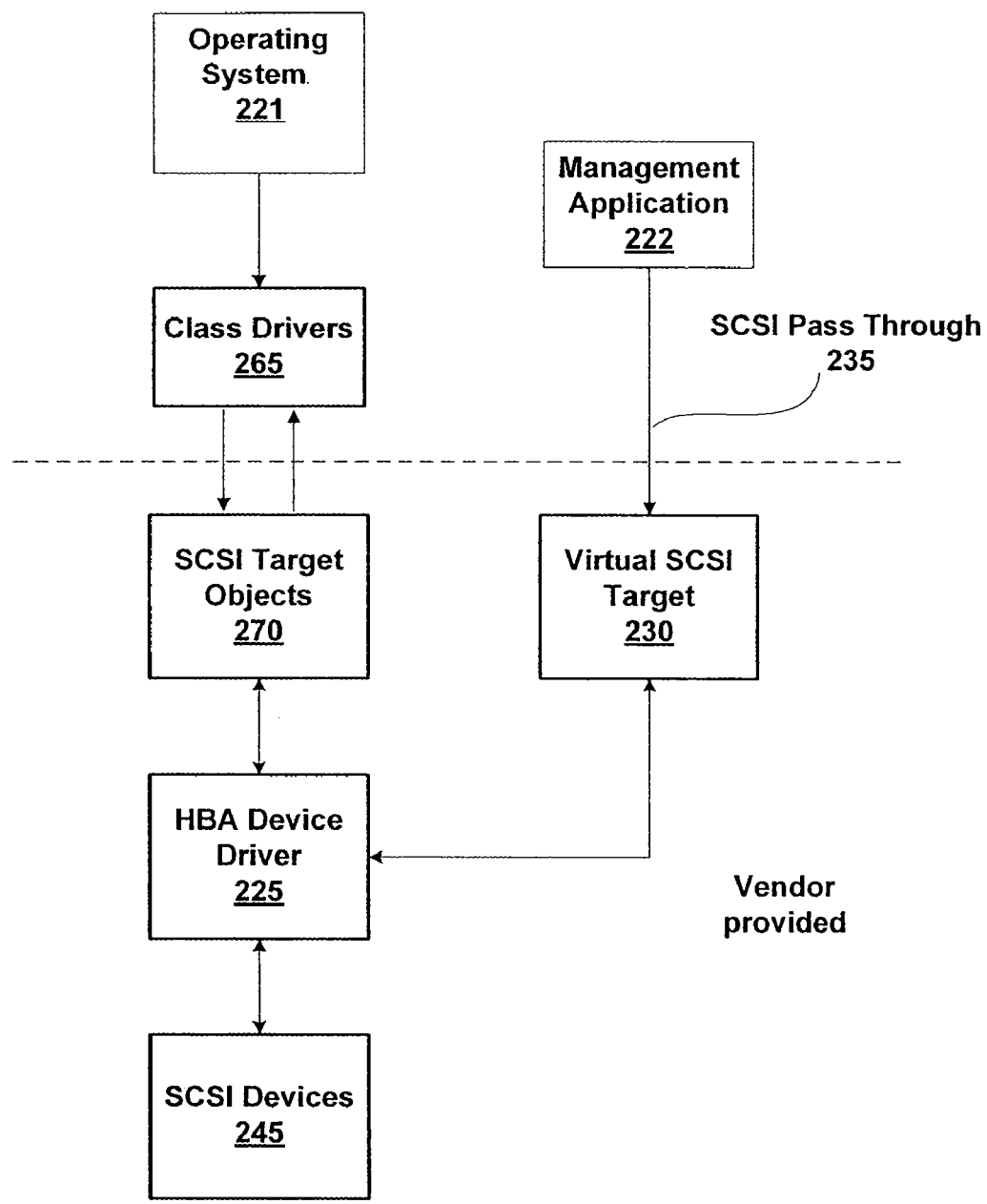
FIG. 2B illustrates a conceptual diagram of the communication mechanisms of FIG. 2A in accordance with one or more aspects of the present invention.

FIG. 2B illustrates a conceptual diagram of the communication mechanisms for accessing HBA 240 of FIG. 2A from a software stack perspective, in accordance with one or more aspects of the present invention. System calls produced by operating system 221 or an application being executed by CPU 210 are input to class drivers 265. A class driver is instantiated within class drivers 265, by the operating system 221, for each physical (not virtual) SCSI target, such as SCSI target 250. The class driver is able to use a standard interface supported by conventional operating systems to communicate with SCSI targets, such as SCSI target 250. HBA driver 225 interfaces between SCSI target objects 270 and SCSI devices 245. SCSI devices 245 includes SCSI target 250, HBA 240, and any additional SCSI based devices that may be coupled to SCSI 205 in computer system 200.

Management application 222 communicates with virtual SCSI target 230 through SCSI pass through 235. Using SCSI pass through 235 permits management application 222 to intermix target commands for logical units 251 and 252 with commands for HBA 240 without interference. In some conventional systems, confirmation that an HBA management command has been executed should be received before a target command for a logical unit may be issued. Therefore, using SCSI pass through 235 to provide HBA management commands via virtual SCSI target 230 may be more efficient since commands for conventional targets may proceed without interference. Virtual SCSI target 230 communicates with HBA driver 225 to provide HBA management commands to HBA 240.

Figure 2C:
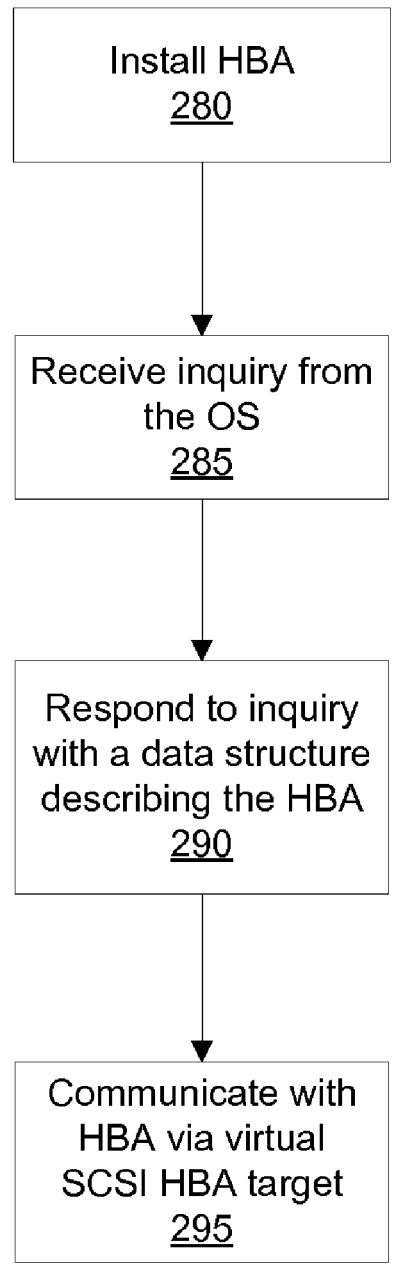
FIG. 2C illustrates a flow diagram of an exemplary method of creating a virtual SCSI target for HBA management in accordance with one or more aspects of the present invention.

FIG. 2C illustrates a flow diagram of an exemplary method of creating virtual SCSI target 230 for HBA management, in accordance with one or more aspects of the present invention.

In step 280 HBA 240 and HBA device driver 225 is installed in computer system 200. In step 285 HBA device driver 225 receives an INQUIRY command from operating system 221 and in step 290 HBA device driver 225 responds with a data structure describing HBA 240 as a logical unit. In particular HBA device driver 225 may respond with standard INQUIRY data specifying a peripheral device type of 1 Fh or 03 h to create virtual SCSI target 230 and logical unit 232. HBA device driver 225 may specify that logic unit 232 provides the required SCSI commands of INQUIRY, REPORT LUNS, and TEST UNIT READY. Unlike HBA 240 or SCSI target 250 that are actual physical devices, virtual SCSI target 230 and logical unit 232 are not physical devices.

In step 295 management application 222 communicates with HBA 240 via virtual SCSI target 230. Virtual SCSI target 230 and logical unit 232 are virtual components created to permit management application 222 to communicate with HBA 240 as a logical unit, i.e., using standard SCSI based access mechanisms to manage HBA 240. The standard interfaces are supported by conventional operating systems, therefore management application 222 does not need to be aware of vendor specific HBA interfaces. Virtual SCSI target 230 represents HBA 240 as logical unit 232 and intercepts commands produced by management application 222 for execution by HBA 240.

Figure 3A:
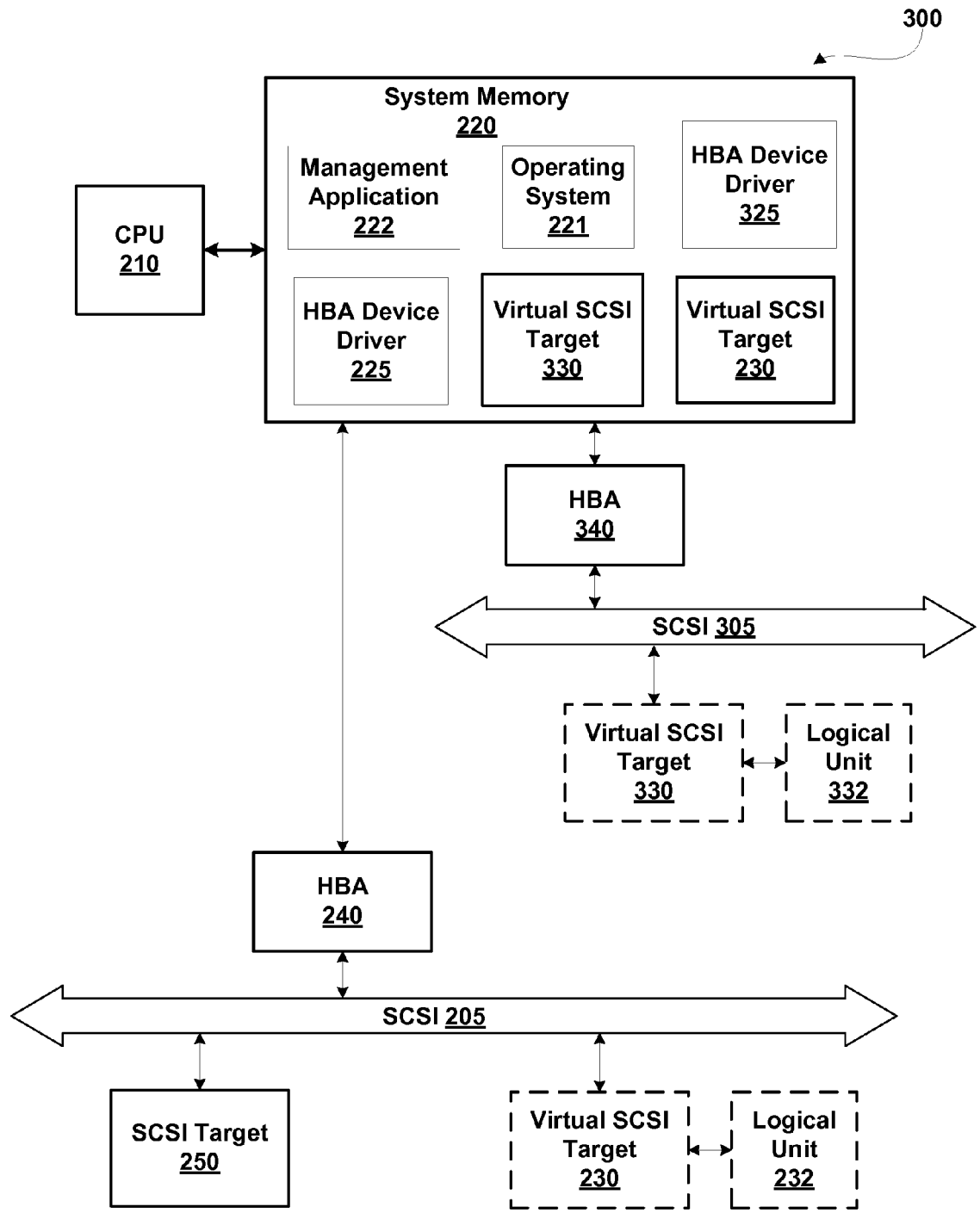
FIG. 3A illustrates another conceptual diagram of a computing system including a CPU and SCSI components in accordance with one or more aspects of the present invention.

FIG. 3A illustrates another conceptual diagram of a computing system 300 including CPU 210 and SCSI components HBA 240, SCSI 205, virtual SCSI target 230, logical unit 232, and SCSI target 250 of FIG. 2A, in accordance with one or more aspects of the present invention. System memory 220, operating system 221, management application 222, and HBA device driver 225 of FIG. 2A are also included in computer system 300. An additional HBA and HBA device driver, HBA 340 and HBA device driver 325, respectively, are also included in computer system 300 to provide SCSI 305 bus. HBA 340 and HBA device driver 325 may be provided by a different vendor than HBA 240 and HBA device driver 225. From the point of view of operating system 221 and management application 222, virtual SCSI target 330 appears as a physical device coupled to a logical unit 332 on SCSI bus 305. Therefore, virtual SCSI target 330 and logical unit 332 are drawn with dashed lines in FIG. 3A, indicating that these virtual components appear as physical devices to operating system 221 and management application 222.

In a conventional system, a management application may need to use different communication mechanisms to access HBAs provided by different vendors. However, virtual SCSI target 330 and logical unit 332 may be used by management application 222 to communicate with HBA 340 using a standard interface, just as virtual SCSI target 230 and logical unit 232 may be used by management application 222 to communicate with HBA 240. A single HBA management command may be simultaneously provided by management application 222 for execution by HBA 240 and HBA 340.

Figure 3B:
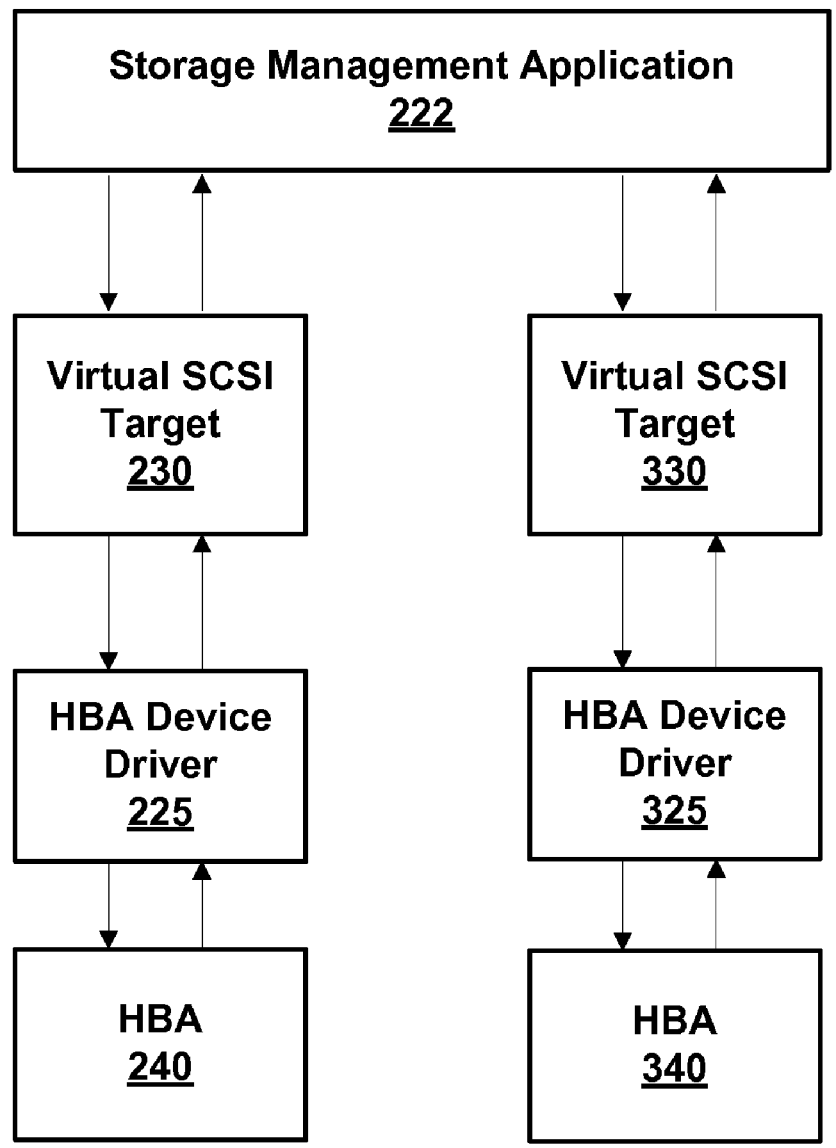
FIG. 3B illustrates a conceptual diagram of the communication layers used to perform HBA management in accordance with one or more aspects of the present invention.

FIG. 3B illustrates a conceptual diagram of the communication layers used to perform HBA management in accordance with one or more aspects of the present invention. Storage management application 222 issues commands to one or more HBAs produced by different vendors, e.g., HBA 240 and HBA 340 to perform management operations. The same command may be simultaneously issued to HBA 240 and HBA 340 because a standard interface is provided by virtual SCSI targets 230 and 330. Therefore, management application 222 may interface with HBA 240 and HBA 340 using the SCSI based access mechanisms provided by conventional operating systems, such as operating system 221, to interface with other logical units. HBAs 240 and 340 may be conventional vendor provided HBAs that do not provide standard interfaces to allow conventional operating systems to access management features, and virtual SCSI target 230 and 330 provide a standard interface that may be used by conventional operating systems to access management features.

In order to issue commands to HBA 240, management application 222 communicates through virtual SCSI target 230. Specifically, commands for virtual SCSI target 230 are intercepted by HBA device driver 225 that is provided by the vendor of HBA 240, so that the HBA management commands do not reach SCSI 205. Likewise, commands for virtual SCSI target 330 are intercepted by HBA device driver 325 that is provided by the vendor of HBA 340, so that the HBA management commands do not reach SCSI 305. The HBA management commands are sent to virtual logical units 232 and 332, from the point of view of management application 222, therefore, management application may also communicate with other physical logical units in system 300 without necessarily waiting for confirmation that the management commands have been executed. Therefore, virtual SCSI targets 230 and 330 allow for efficient communication with HBAs and may improve overall communication bandwidth for physical targets.

Figure 3C:
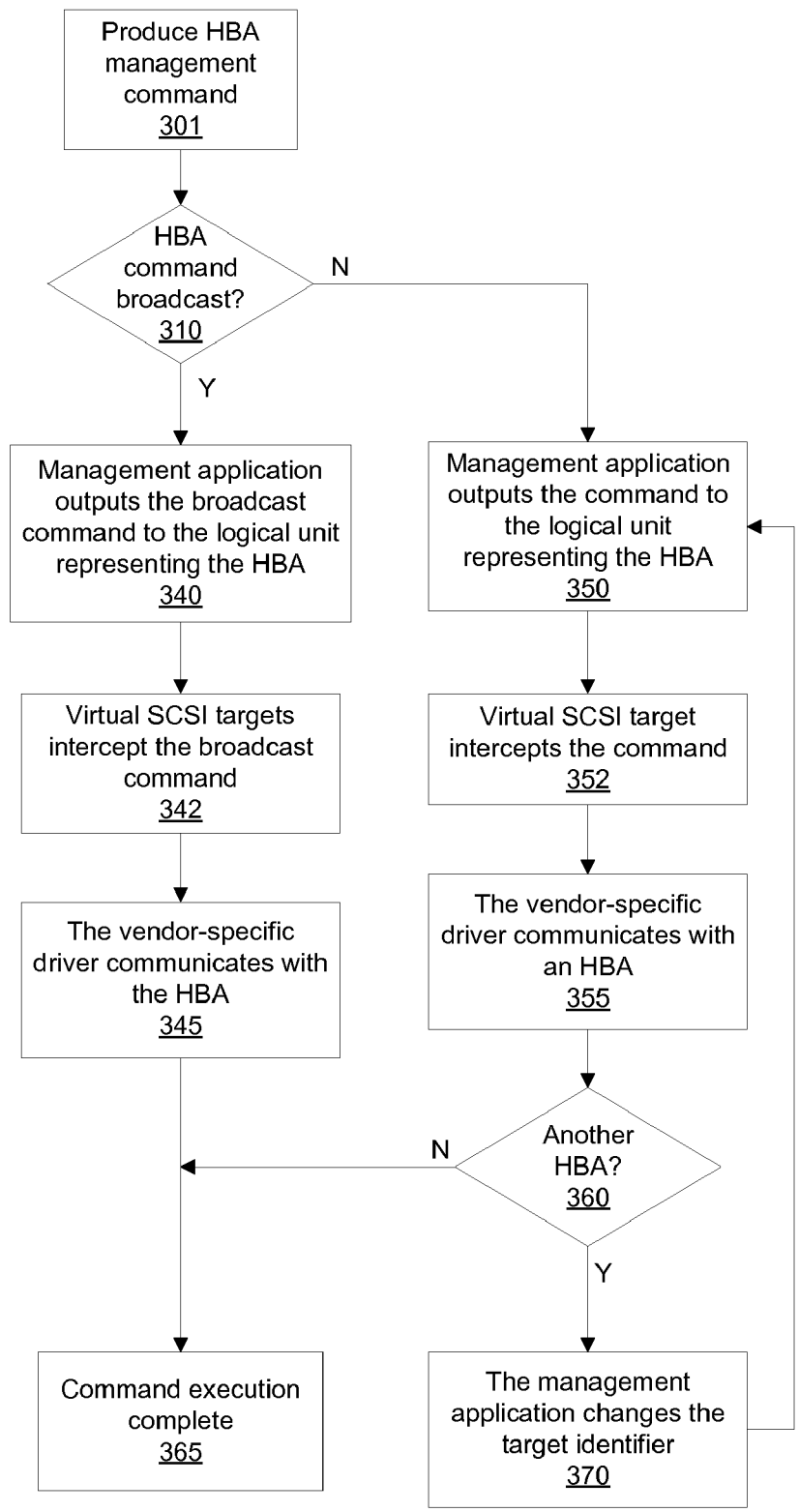
FIG. 3C illustrates a flow diagram of an exemplary method of performing HBA management using a virtual SCSI target in accordance with one or more aspects of the present invention.

FIG. 3C illustrates a flow diagram of an exemplary method of performing HBA management using virtual SCSI target 230 or 330, in accordance with one or more aspects of the present invention. In step 301 storage management application 222 produces a management command for HBA 240.

In step 310 management application 222 determines if the HBA management command produced in step 301 should be output to multiple HBAs in the system. The management command may be broadcast for execution by other HBA in the system that is represented as a logical unit by a virtual SCSI target, such a HBA 340. Alternatively, the management command can be issued to a specific HBA by specifying a particular target identifier in the command.

If, in step 310 management application 222 determines that the HBA management command should be output to multiple HBAs, e.g., HBA 240 and 340, then in step 340 management application 222 outputs the (broadcast) management command to HBAs 240 and 340 that are represented by virtual SCSI targets 230 and 330 as logical units 232 and 332, respectively. In step 342 virtual SCSI targets 230 and 330 intercept the broadcast command and provide it to device drivers 225 and 325, respectively. In step 345 the vendor specific HBA device drivers, HBA device drivers 225 and 325, communicate with the corresponding HBA, HBA 240 and 340, respectively to execute the management command produced by management application 222 in step 301.

If, in step 310 management application 222 determines that the HBA management command should not be output to multiple HBAs, then in step 350 management application 222 provides the management command to a particular HBA, e.g., HBAs 240 or 340, by specifying a particular target identifier corresponding to logical unit 232 or 233, respectively, with the management command. In step 352 virtual SCSI target 230 or 330 intercept the command and provide it to device drivers 225 or 325, respectively. In step 355 the vendor specific HBA device driver corresponding to the target identifier, communicates with the corresponding HBA to execute the management command produced by management application 222 in step 301. In step 360 management application 222 determines if another HBA should receive the command, and, if so, in step 370 management application 222 modifies the target identifier to correspond to another HBA and returns to step 350.

If, in step 360 management application 222 determines that another HBA should not receive the command, then management application 222 proceeds to step 365. In step 365 execution of the management command is complete. Note that it is not necessary for storage management application 222 to wait to receive confirmation from the HBAs that the management command has been executed.

Persons skilled in the art will appreciate that any system configured to perform the method steps of FIGS. 2C, 3C, or their equivalents, is within the scope of the present invention. A virtual SCSI target is created to emulate each HBA in a system, representing the HBA as a logical unit. Standard commands specified for logical units are used by an HBA device driver to perform HBA management operations. The standard commands, compatible with conventional operating systems may be used to access HBA management features for any HBA regardless of the particular HBA vendor. Therefore, the HBA communication interface is standardized for HBA devices, permitting efficient access regardless of the operating system or HBA vendor. HBA management commands may be broadcast to multiple HBAs simultaneously or may be output for execution by a particular HBA. The storage management application does not need to wait for confirmation that HBA management commands have completed execution since the HBAs are emulated as logical units. Therefore, communication with physical logical units may by intermixed with management commands, allowing for a more efficient use of the available SCSI bandwidth.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer-implemented method for standardizing communication between a storage management application and a Small Computer System Interface (SCSI) host bus adapter within a computing device, comprising:
   representing a first SCSI host bus adapter of a plurality of SCSI host bus adapters that is coupled to a first SCSI bus as a first logical unit coupled to the first SCSI bus through a first virtual SCSI target of a plurality of virtual SCSI targets that is stored in system memory of the computing device and is not physically present on the first SCSI bus, wherein the first logical unit and the first virtual SCSI target appear as physical devices on the first SCSI bus to the storage management application;
   intercepting, by the first virtual SCSI target, a management command produced by the storage management application for execution by the first logical unit that represents the first SCSI host bus adapter;
   translating the intercepted management command for execution by the first SCSI host bus adapter to produce a translated management command;
   providing the translated management command to the first SCSI host bus adapter for execution without transmitting over the first SCSI bus; and
   executing the management command by the first SCSI host bus adapter to perform management operations that change settings of the first SCSI host bus adapter.

2. The method of claim 1, further comprising transmitting the management command to the first logical unit that represents the first SCSI host bus adapter using a SCSI pass through interface.

3. The method of claim 1, further comprising responding to an inquiry received from an operating system with a data structure describing the first SCSI host bus adapter as the first logical unit, wherein the operating system does not provide an interface enabling communication between the storage management application and the first SCSI host bus adapter.

4. The method of claim 1, further comprising:
   representing a second SCSI host bus adapter as a second logical unit coupled to a second SCSI bus through a second virtual SCSI target that is not physically present on the second SCSI bus, wherein the second logical unit and the second virtual SCSI target appear as physical devices on the second SCSI bus to the storage management application;
   intercepting the management command produced by the storage management application for execution by the second logical unit that represents the second SCSI host bus adapter to produce a second intercepted management command;
   translating the second intercepted management command for execution by the second SCSI host bus adapter to produce a second translated management command;
   providing the second translated management command to the second SCSI host bus adapter for execution without transmitting the management command over the second SCSI bus; and
   executing the management command by the second SCSI host bus adapter to perform management operations that change settings of the second SCSI host bus adapter.

5. The method of claim 1, further comprising communicating with other logical units coupled to the first SCSI bus without waiting for confirmation that the management command was executed by the first SCSI host bus adapter.

6. The method of claim 1, further comprising specifying a first target identifier for the management command, wherein the first target identifier corresponds to the first virtual SCSI target.

7. The method of claim 1, further comprising:
   representing a second SCSI host bus adapter as a second logical unit coupled to a second SCSI bus through a second virtual SCSI target that is not physically present on the second SCSI bus, wherein the second logical unit and the second virtual SCSI target appear as physical devices on the second SCSI bus to the storage management application;
   producing an additional management command for execution by the second logical unit that represents the second SCSI host bus adapter; and
   specifying a second target identifier corresponding to the second virtual SCSI target for the additional management command.

8. A computer-readable medium storing instructions for causing a processor to use a standard interface to access management features of a first Small Computer System Interface (SCSI) host bus adapter within a computing device, by performing the steps of:
   representing the first SCSI host bus adapter of a plurality of SCSI host bus adapters that is coupled to a SCSI bus as a first logical unit that is coupled to the SCSI bus through a first virtual SCSI target of a plurality of virtual SCSI targets that is stored in system memory of the computing device and is not physically present on the first SCSI bus, wherein the first logical unit and the first virtual SCSI target appear as physical devices on the first SCSI bus to a storage management application;

intercepting, by the first virtual SCSI target, a management command produced by the storage management application for execution by the first logical unit that represents the first SCSI host bus adapter;

translating the intercepted management command for execution by the first SCSI host bus adapter to produce a translated management command; and providing the translated management command to the first SCSI host bus adapter for execution without transmitting over the first SCSI bus, wherein the execution of the management command by the first SCSI host bus adapter changes settings of the first SCSI host bus adapter.

9. The computer-readable medium of claim 8, further comprising broadcasting a portion of the management commands output by the storage management application to the first logical unit that represents the first SCSI host bus adapter and to a second logical unit that represents a second SCSI host bus adapter, wherein the second logical unit appears to the storage management application as a physical device coupled to on a second SCSI bus through a second virtual SCSI target.

10. The computer-readable medium of claim 8, further comprising specifying a first target identifier corresponding to the first virtual SCSI target for a first portion of management commands that are output by the storage management application for execution by the first logical unit that represents the first SCSI host bus adapter.

11. The computer-readable medium of claim 8, further comprising communicating with other logical units coupled to the first SCSI bus without waiting for confirmation that the management commands were executed by the first SCSI host bus adapter.

12. A system for standardizing communication between a storage management application and a Small Computer System Interface (SCSI) host bus adapter within a computing device, comprising:
a central processing unit (CPU) configured to execute the storage management application;
a system memory coupled to the CPU and configured to store the storage management application and a first virtual SCSI target of a plurality of virtual SCSI targets; and
a plurality of SCSI host bus adapters including a first SCSI host bus adapter coupled to the system memory to provide a first SCSI bus,
wherein the first virtual SCSI target is configured to emulate the first SCSI host bus adapter as a first logical unit coupled to the first SCSI bus,
wherein the first virtual SCSI target and the first logical unit appear as physical devices on the first SCSI bus to the storage management application,
wherein the first virtual SCSI target is configured to intercept a management command produced by the storage management application,
wherein the intercepted management command is translated to produce a translated management command, and
wherein the first SCSI host bus adapter is configured to execute the translated management command to perform management operations that change settings of the first SCSI host bus adapter without transmitting over the first SCSI bus.

13. The system of claim 12, wherein the first virtual SCSI target is configured to respond to an inquiry command with a data structure describing the first SCSI host bus adapter as the first logical unit coupled to the first SCSI bus.

14. The system of claim 12, further comprising:
a second SCSI host bus adapter coupled to the system memory to provide a second SCSI bus,
wherein a second virtual SCSI target stored in the system memory is configured to emulate the second SCSI host bus adapter as a second logical unit coupled to the second SCSI bus, wherein the second virtual SCSI target and the second logical unit appear as physical devices on the second SCSI bus to the storage management application, the first virtual SCSI target provides a standard interface for communications between the storage management application and the first SCSI host bus adapter, and the second virtual SCSI target provides a standard interface for communications between the storage management application and the second SCSI host bus adapter.

15. The system of claim 12, wherein the storage management application is configured to communicate with physical SCSI targets coupled to the first SCSI bus without waiting for confirmation that management commands have been executed by the first SCSI host bus adapter.

16. The method of claim 4, wherein the management command is simultaneously issued to the first logical unit and the second logical unit by the storage management application and,
the translating of the intercepted management command is performed by a first device driver that is specific to a first vendor of the first SCSI host bus adapter and the translating of the second intercepted management command is performed by a second device driver that is specific to a second vendor of the second SCSI host bus adapter that is different than the first vendor.

17. The computer-readable medium of claim 9, further comprising:
translating, by a first device driver that is specific to a first vendor of the first SCSI host bus adapter, the portion of the management commands to produce a first translated portion of the management commands for execution by the first SCSI host bus adapter; and
separately translating, by a second device driver that is specific to a second vendor of the second SCSI host bus adapter that is different than the first vendor, the portion of the management commands to produce a second translated portion of the management commands for execution by the second SCSI host bus adapter.

18. The system of claim 12, wherein the management command is simultaneously issued to the first SCSI host bus adapter and a second SCSI host bus adapter by the storage management application and the translating of the second intercepted management command is performed by a first device driver that is specific to a first vendor of the first SCSI host bus adapter, and configured to translate the management command for execution by the first SCSI host bus adapter; and
a second device driver that is specific to a second vendor of the second SCSI host bus adapter that is different than the first vendor, and configured to separately translate the management command intercepted by a second virtual SCSI target for execution by the second SCSI host bus adapter.

19. The computer-readable medium of claim 8, further comprising responding to an inquiry received from an operating system with a data structure describing the first SCSI host bus adapter as the first logical unit, wherein the operating system does not provide an interface enabling communication between the storage management application and the first SCSI host bus adapter.

20. The system of claim 12, further comprising a first device driver that is stored in the system memory and configured to respond to an inquiry received from an operating system with a data structure describing the first SCSI host bus adapter as the first logical unit, wherein the operating system does not provide an interface enabling communication between the storage management application and the first SCSI host bus adapter.

* * * * *

UNITED STATES PATENT AND TRADEMARK OFFICE
CERTIFICATE OF CORRECTION

| | | |
|---|---|---|
| PATENT NO. | : 8,095,715 B1 | Page 1 of 1 |
| APPLICATION NO. | : 11/470032 | |
| DATED | : January 10, 2012 | |
| INVENTOR(S) | : Mark A. Overby | |

It is certified that error appears in the above-identified patent and that said Letters Patent is hereby corrected as shown below:

IN THE CLAIMS:

Column 9, Claim 9, line 23 please delete "on".

Signed and Sealed this
Second Day of October, 2012

David J. Kappos
*Director of the United States Patent and Trademark Office*